Figure 1:
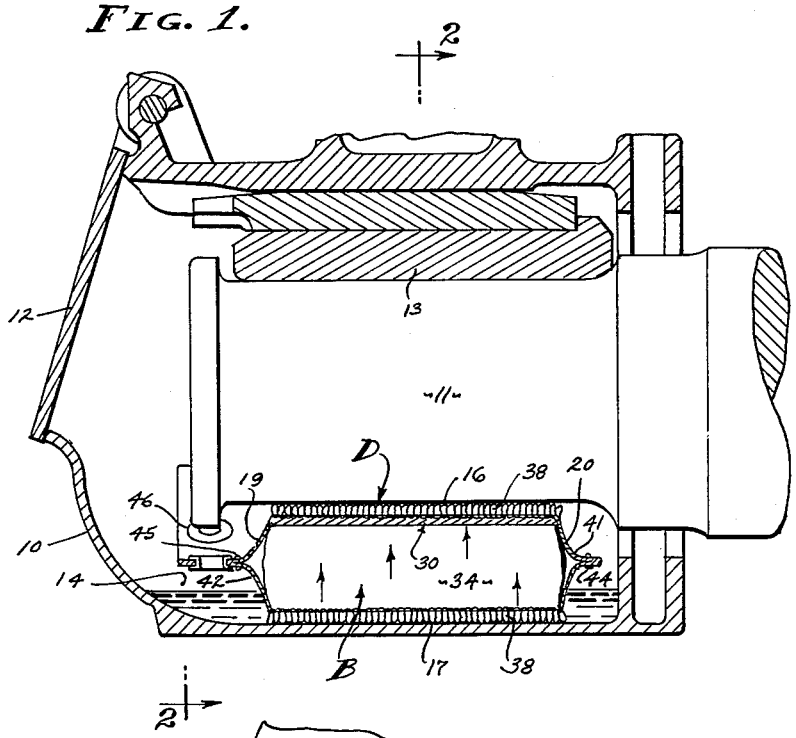

April 23, 1963     R. K. H. RUNKNAGEL     3,086,828
LUBRICATOR PAD AND WICKING UNIT THEREFOR Filed March 9, 1960                                              2 Sheets-Sheet 1

INVENTOR.
ROLF K. H. RUNKNAGEL
BY
*Wm. H. Maxwell*
AGENT

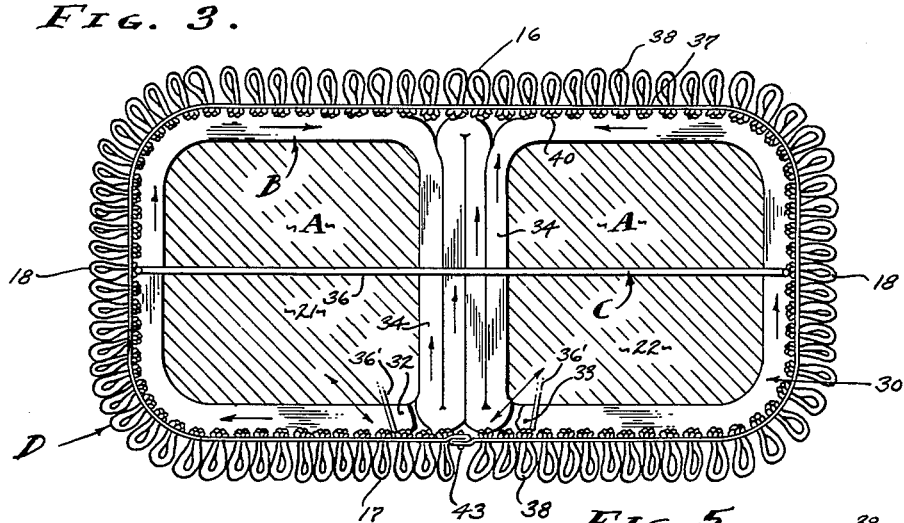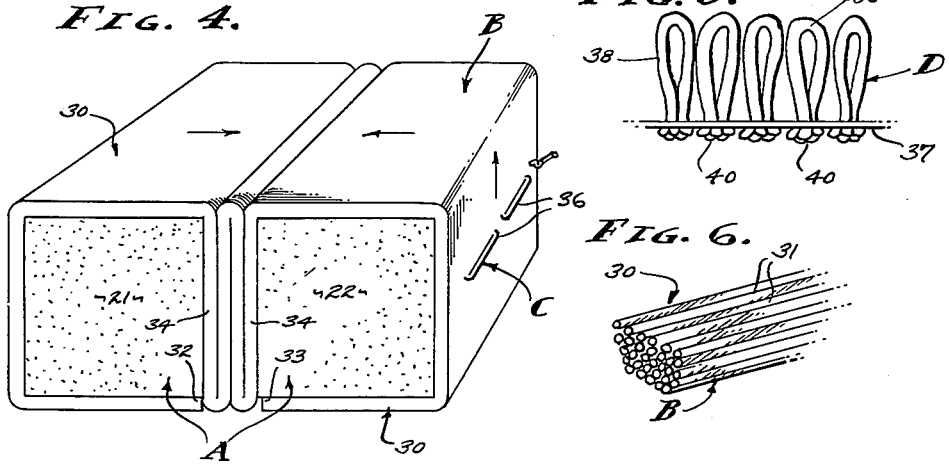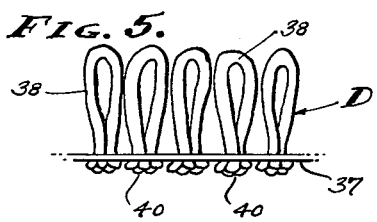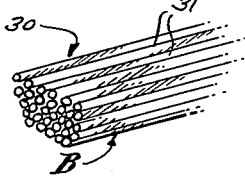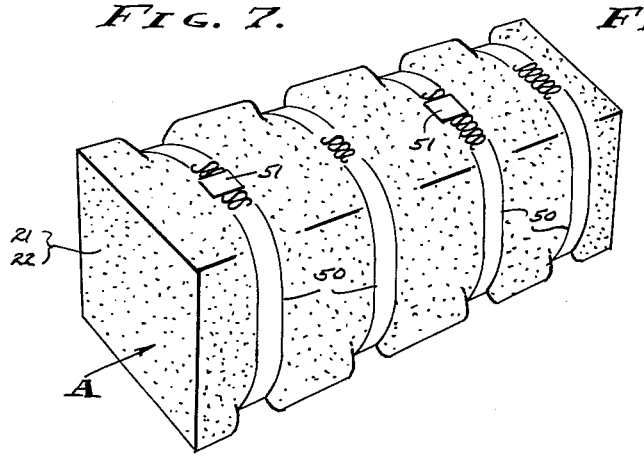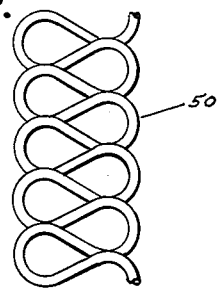

United States Patent Office 3,086,828
Patented Apr. 23, 1963

3,086,828
LUBRICATOR PAD AND WICKING UNIT THEREFOR
Rolf K. H. Runknagel, Malibu, Calif.
(17000 Ventura Blvd., No. 208, Encino, Calif.)
Filed Mar. 9, 1960, Ser. No. 13,818
2 Claims. (Cl. 308—243)

This invention relates to journal boxes for railroad cars and is particularly concerned with a wicking unit and lubricator pad construction for use in journal boxes, it being a general object of this invention to provide an efficient and inexpensive lubricator pad for journal boxes, and a pad having all of the standardized and required features.

Railroad cars are provided with a universal construction characterized by journal boxes that support the weight of the cars upon journals that project from the wheel and axle units. The journal that turns with the wheel enters the box horizontally where it frictionally engages a "brass," or bearing, said bearing being positioned within the upper portion of the box and adapted to have supporting engagement with the top circumferential portion of the journal. In order to lubricate the brass it is common practice to fill the lower portion of the box, to a suitable level, with oil, or the like, and to conduct the oil to the brass through "waste" which has a wicking action. Waste, as used in times past, and which may still be used in some cases, is not altogether satisfactory and the present state of the art provides lubricator pads designed to assure lubrication of the journal.

It is very important that journals be properly lubricated in order to avoid so-called "hot boxes," and it is for this reason that it is feasible to employ special constructions for the purpose of lubrication, instead of simple waste material which is not reliable. Many lubricator pad constructions have been proposed and some are in wide use. However, these pads that are in use are not altogether satisfactory since they are either expensive due to the type of material involved or they are of complicated construction in order to be made of cheaper or of less material. Further, many of the lubricator pads that are in use are inherently inadequate and they are inefficient as compared with the lubricator pad herein disclosed. That is, adequate wicking action is not always provided for in the ordinary lubricator pads.

An object of this invention is to provide a lubricator pad for use in a journal box and which supplies adequate lubricant to the lower central portion of the journal. With the structure that I provide, there is a separate wicking means that efficiently conducts lubricant to the place desired and which is then transferred to the journal and bearing surfaces by means of a cover element that acts as an applicator.

Another object of this invention is to provide a lubricator pad that can be manufactured of absorbent and inexpensive material that is particularly suited to the wicking of lubricant onto the journal. With the structure that I provide, cotton can be used exclusively, if so desired, with the exception of the core elements which are preferably of plastic sponge material adapted to contain lubricant and to offer resilience that presses the contacting parts of the lubricator pad into engagement with the journal.

It is still another object of this invention to provide a lubricator pad of the character referred to that can be made without resort to rigid parts, such as metallic frame parts and/or springs, and which nevertheless has sufficient pressured engagement with the journal to assure proper lubrication thereof.

It is also an object of this invention to provide a lubricator pad of the character thus far set forth and which can be supplemented, if so desired, by mechanical means in the form of metallic springs that assure longer life of the lubricator pad by providing positive resilience in the event that the plastic cores become compacted and more or less ineffective for providing pressure.

Figure 2:
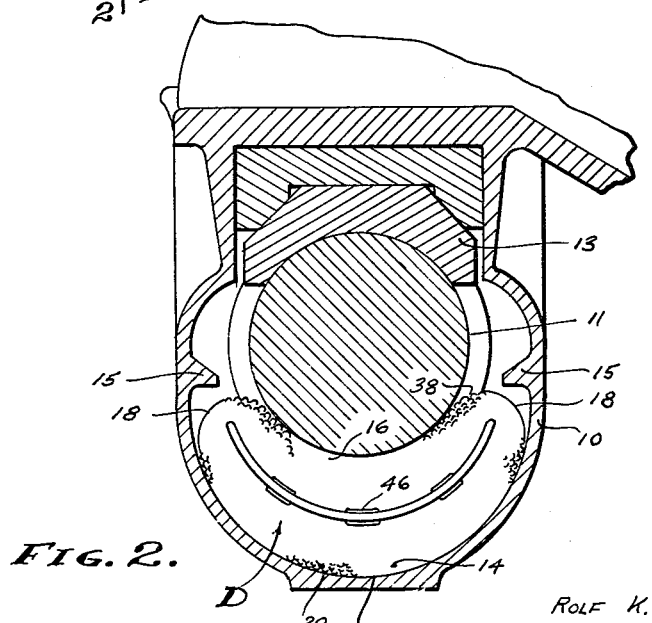

The various objects and features of my invention will be fully understood from the following detailed description of the typical and preferred form and application of the invention, throughout which description reference is made to the accompanying drawing, in which:

FIG. 1 is a longitudinal sectional view of a typical journal box and illustrates the installation of the lubricator pad of the present invention. FIG. 2 is a transverse section taken as indicated by line 2—2 on FIG. 1. FIG. 3 is an enlarged detailed transverse sectional view showing the manner in which the lubricator pad is constructed. FIG. 4 is a perspective view of the unit of construction that is provided by the present invention to have a wicking action. FIG. 5 is an enlarged detailed fragmentary view of the applicating cover that is provided. FIG. 6 is a fragmentary perspective view of the roving that is employed in the construction. FIG. 7 is a perspective view of one of the core bodies and showing the manner in which the resilient bands encircle the same, and FIG. 8 is an enlarged detailed view of a portion of one of the bands that is shown in FIG. 7.

The lubricator pad of the present invention is a unitized construction that can be made exclusively of textile cotton material for wicking action and filled with one or more sponge cores. The core or cores serve to fill or inflate the pad and act to contain lubricant and to resiliently press the top of the pad into engagement with the bottom circumferential portion of the journal. As illustrated generally in the drawings, the usual journal box involves the horizontally disposed housing 10 open at its inner end to rotatably receive the journal 11 and closed at its outer end by cover 12. The journal box is characterized by the brass 13 positioned in the upper portion thereof and by the oil reservoir or sump 14 at the lower portion thereof. The lubricator pad, as herein disclosed, is placed in and occupies the space beneath the journal 11 and rests in the sump 14 to wick lubricant therefrom, and there are longitudinally disposed stops 15, one at each side of the housing 10, that are effective to retain the lubricator pad in working position and to prevent rotation thereof out of said position. It is to be understood that the journal and journal box structure may include any and all of the features commonly employed in such structures.

The lubricator pad is of the general form and configuration that is ordinarily resorted to in such a device. That is, the pad as it is originally constructed is, for all intents and purposes, rectangular in shape having a top 16, a bottom 17, sides 18, and front and back ends 19 and 20, respectively. The structure is soft and pliable as well as compressible, all to the end that it readily conforms to the interior of the housing 11 where it operates to wick lubricant onto the journal 11. As above pointed out, the unitized pad construction is made, for the most part, of textile cotton and employing specific forms of textile elements, each adapted to perform its specific function. It is well known that cotton fibers are relatively strong and that they have high absorbent characteristics. Therefore, the present invention involves a combination of elements made of cotton fibers that are combined and related to have maximum wicking action in order to conduct lubricant from the sump 14 and to have maximum applicating action in order to apply said lubricant onto the journal and bearing surfaces.

As shown throughout the drawings, the lubricator pad involves, generally, a core A, wicking means B, binding C, and an applicating cover D. The core A is the filler or body element that determines the general configuration and size of structure and upon which the other elements are built. The wicking means B is shaped over the core A and provided to absorb and conduct lubricant upwardly toward the journal to be lubricated. The binding C is provided to secure the elements A and B in proper working relationship to each other and in a unit of construction, and the cover D is an envelope element that contains the elements A, B and C and which receives lubricant from the wicking means B to apply said lubricant onto the journal and bearing surfaces.

The core A, in accordance with the invention, is a sectional core that fills the structure and which acts to both contain lubricant and to become compressed and resiliently expand for yieldingly urging the top 16 of the pad into engagement with the journal 11. The core A involves a pair of like rectangular bodies 21 and 22 that are substantially square in cross section and elongate, terminating in flat normal ends. It will be apparent that the cross sectional size and length of the bodies 21 and 22 will determine the normally uncompressed size of the structure that is built thereon, as later described (see FIG. 3). The bodies are disposed side by side and parallel with each other, in spaced relationship, and they are preferably of a sponge material having substantial resilience. In practice I employ a foamed plastic material having interconnected cells and which is absorbent to contain lubricant, as a sponge. It is to be understood that any suitable compressible body of material can be employed as a core section, preferably a sponge type of material for the purpose of serving as a reservoir.

The wicking means B that is provided to absorb and conduct lubricant upwardly to the journal and bearing surfaces is formed over or on the core bodies 21 and 22. In accordance with the invention, the wicking means B is formed of highly absorbent material, preferably textile cotton formed in a manner especially adapted to have maximum wicking action. That is, the means B is not only made of absorbent material but it is also of a formation and character to have the ability to conduct lubricant to the place desired and in a most efficient manner. In accordance with the invention, the wicking means B is in the form of roving 30, preferably fibrous cotton roving, and which comprises a multiplicity of loosely twisted strands 31 of fibers arranged in a mat. In practice, the roving 30 can be several, or more, strands in thickness and with said strands extending parallel with each other and in one common direction, or substantially so (see FIG. 6). Thus, the roving 30 presents a layer or sheet of highly absorbent material and particularly adapted to conduct fluid or lubricant, in the direction in which the fibers thereof extend.

In carrying out the invention, the roving 30 is arranged to extend the axes of its fibers transversely of the core bodies 21 and 22, and is wrapped around and folded between the said bodies 21 and 22 in order to conduct lubricant upwardly by absorbing and wicking action. That is, the axes of the strands 31 extend, generally, transversely and with the folding that I provide portions thereof extend vertically, all to the end that the lowermost portions of the roving 30 can be immersed in the lubricant carried in the sump 14 and so that the uppermost portions lead to the journal where lubrication is desired. In practice, I wrap the roving around the core bodies 21 and 22, with the ends 32 and 33 thereof terminating at or along the lower inner edges of said bodies, as shown, and I provide at least one fold 34 that depends between the pair of core bodies. As shown, throughout the drawings, the fold 34 is a central fold that lies intermediate the bodies 21 and 22 and which extends downward to the lower plane or edges of the opposite parallel core bodies. Thus, the wicking means B is characterized by a single continuous roving 30 of highly absorbent material that is wrapped from the lower center of the structure to extend outwardly and then upwardly, after which it extends inward at the top of the pad and to the center thereof where it has the characteristic depending fold 34. In the preferred form, there is a plurality of folds 34, for example a pair of folds, thereby establishing a substantial body of vertically disposed wicking strands 31 at the central portion of the pad (see FIG. 3). As a result of the provision of said pair of folds there are four layers of roving 30 extending to the lower plane or edge of the cores 21 and 22 and each adapted to absorb and conduct lubricant upwardly by its own individual wicking action.

The binding C that secures the elements A and B in proper working position relative to each other can vary in form and simply holds the wrapping of roving in place over and between the cores 21 and 22. In its preferred form the binding C involves lacing 36 that is passed several times through the three parts which are thereby secured together as a unit of construction, as clearly illustrated in FIG. 4. The lacing 36 is passed alternately back and forth through the cores, substantially midway between the tops and bottoms thereof and horizontally and through the roving 30. The lacing 36 forms loops that are pulled sufficiently tight to hold the roving in place against the sides of the cores 21 and 22 and the transverse portions of the lacing pierce the folds 34 to hold the roving in place between the cores 21 and 22 (see FIG. 3). The ends of said lacing 36 can be suitably tied as indicated, and also, the terminal ends of the roving can be achored by additional lacing 36', if so desired.

The applicating cover D that contains the elements A, B and C is adapted to receive the lubricant wicked upwardly by the wicking means B. The cover D is an envelope or jacket that encases the two cores and surrounding roving and it involves a woven backing 37 with a looped pile 38 of soft yarn interlocked therein. By nature of its woven character that involves the backing 37 and loops 38 of soft yarn, the cover D can be referred to as being a Chenille cover, said soft yarn being particularly adapted to absorb and wick lubricant in a direction normal to the plane of the backing 37. However, it is inherent that such a construction is not particularly adapted to wick lubricant in the direction or plane of the backing, since the backing is of substantially hard twist and involves relatively few strands of rather small cross section.

In accordance with the invention, the looped pile 38 is soft and lengthy, preferably of textile cotton, and knotted into the backing 37 at 40. In practice, the knots at 40 are augmented by tying them several or more times (see FIG. 5), in order to increase the contact with the underlying wicking means B. That is, the knots that are exposed at the underside of the cover are made extensive in order to increase contact of the wicking pile with the wicking roving. Thus, the lubricant that is conducted upwardly by the roving 30 is transferred to the knots at 40 whereby the yarn forming the pile 38 conducts the lubricant through the backing 37, all without help of said backing. In other words, the backing 37 simply functions in a mechanical capacity to carry the looped pile 38 and is not relied upon to conduct lubricant, nor is the pile 38 relied upon to transfer lubricant laterally from loop to loop.

The Chenille, or equivalent, cover D is preferably manufactured in continuous strip form with widened margins 41 and 42 devoid of pile 38. In order to form the envelope-shaped cover, the woven material is cut to a length suitable to encompass the core and roving unit and the opposite ends are joined by suitable sewing at 43 positioned centrally at the lower side of the pad. The tubular cover thus established is then closed at one end by sewing at 44 that joins the margin 41. The core and roving unit is then inserted into the cover D through the open end, after which said open end is closed by sewing at 45. Thus, the core and roving unit is encased and protected, there being grommets 46 provided in the margin 42 as pull handles (see FIG. 1).

In addition to the foregoing, the cores 21 and 22 are supplemented for the purpose of resilience by means of metallic spring bands 50. Although the foamed plastic core is perfectly satisfactory for normal life of a lubricator pad of the type under consideration, nevertheless there are consumers who will require assurance of greater life of such pads. Recognizing that plastic foamed material may in time lose a portion of its memory, metallic spring bands 50 are provided that will not change. As shown, the spring bands 50 encircle the core bodies 21 and 22 and are carried thereby, without a frame structure. In the particular case illustrated, the spring bands 50 are of unique construction being an elongate flattened structure established by a single length of resilient metal formed in a serpentine manner and with adjacent convolutions in overlapping engagement (see FIG. 8). The ends of the spring bands 50 are coupled at 51 and a cement or adhesive can be employed to retain said bands in position. The spring bands 50 are placed at suitable intervals, as shown.

From the foregoing it will be apparent that I have provided a relatively inexpensive and yet very practical and efficient lubricating pad of the type under consideration. With the wicking means B that I provide, in the form of roving of soft cotton yarn, there is uninterrupted and adequate flow of lubricant from the bottom portion of the pad and upwardly therethrough to the top 16 thereof (see the arrows in FIG. 3). In particular, the multi-folds 34 of roving at the central portion of the lubricating pad assure ample flow for conduction of lubricant to the underside of the journal 11. The lubricant that is conducted to the top of the lubricating pad is transferred to the journal 11 by means of the applicating cover C which is particularly adapted for this purpose having the deep pile 38 of loops of soft cotton yarn. It will be apparent that the core bodies 21 and 22 will contain substantial lubricant therein and that there will be a pumping action, as indicated by the double arrows in FIG. 3, that will further supply the wicking in the event that the journal box sump 14 becomes empty.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention I claim:

1. A lubricator pad for use in a journal box and adapted to wick lubricant onto a journal extending into the box, and including, a pair of resilient core bodies arranged side by side, wicking means comprising a layer of roving of parallel capillary fibers engaged with and wrapped around and with at least one fold extending vertically between said core bodies, and a lubricant applicating cover engagedly overlying and encasing the wicking means to receive lubricant therefrom and adapted to be pressed into engagement with the journal by resiliency of the core bodies.

2. A lubricator pad for use in a journal box and adapted to wick lubricant onto a journal extending into the box, and including, a pair of resilient core bodies of sponge material arranged side by side, wicking means comprising a layer of roving of parallel capillary fibers engaged with and wrapped transversely around and with at least one fold extending vertically between said core bodies, and a lubricant applicating cover comprising a backing having a looped pile engagedly overlying and encasing the wicking means to receive lubricant therefrom and adapted to be pressed into engagement with the journal by resiliency of the core bodies.

References Cited in the file of this patent

UNITED STATES PATENTS

| | | |
|---|---|---|
| 1,810,443 | Steurs | June 16, 1931 |
| 2,480,984 | Van Issum | Sept. 6, 1949 |
| 2,884,289 | Sockell | Apr. 28, 1959 |
| 2,929,665 | Sockell | Mar. 22, 1960 |
| 2,936,202 | Barber | May 10, 1960 |
| 2,969,261 | Stine | Jan. 24, 1961 |
| 2,992,051 | Murray | July 11, 1961 |
| 3,019,069 | Barth et al. | Jan. 30, 1962 |

OTHER REFERENCES

Railway Age, issue of February 9, 1959, pages 20 and 21 relied upon.

Wikit Journal Lubricators, by Callaway Mills, Inc., Jan. 28, 1959, pages 1–4.